US012562931B2

(12) United States Patent
Yan et al.

(10) Patent No.: US 12,562,931 B2
(45) Date of Patent: Feb. 24, 2026

(54) SYSTEMS AND METHODS FOR OPTIMIZED NETWORK DEVICE COMMUNICATIONS

(71) Applicant: Verizon Patent and Licensing Inc., Basking Ridge, NJ (US)

(72) Inventors: Lixia Yan, Basking Ridge, NJ (US); Shanthala Kuravangi-Thammaiah, Keller, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 404 days.

(21) Appl. No.: 18/175,716

(22) Filed: Feb. 28, 2023

(65) Prior Publication Data

US 2024/0291682 A1 Aug. 29, 2024

(51) Int. Cl.
H04L 12/14 (2024.01)
H04W 8/20 (2009.01)
H04W 68/00 (2009.01)

(52) U.S. Cl.
CPC ........... H04L 12/1407 (2013.01); H04W 8/20 (2013.01); H04W 68/005 (2013.01)

(58) Field of Classification Search
CPC .. H04L 12/1407; H04W 8/20; H04W 68/005; H04W 4/24; H04M 15/66
See application file for complete search history.

(56) References Cited

U.S. PATENT DOCUMENTS

| | | | |
|---|---|---|---|
| 2012/0291089 A1* | 11/2012 | Bomgardner | ....... G06F 21/6236 726/1 |
| 2019/0313359 A1* | 10/2019 | Lee | ......................... H04W 4/40 |
| 2019/0364415 A1* | 11/2019 | Gao | ......................... H04W 8/20 |
| 2019/0394279 A1* | 12/2019 | Dao | ...................... H04W 48/04 |
| 2020/0221541 A1* | 7/2020 | Yan | ....................... H04M 15/66 |
| 2021/0168584 A1* | 6/2021 | Li | ......................... H04W 28/16 |
| 2022/0159606 A1* | 5/2022 | Sun | ....................... H04W 76/11 |
| 2023/0068412 A1* | 3/2023 | Singh | .................... H04W 8/186 |
| 2023/0379845 A1* | 11/2023 | Krishan | .............. H04W 56/001 |
| 2025/0227451 A1* | 7/2025 | Li | ......................... H04W 60/00 |

* cited by examiner

*Primary Examiner* — Christine Ng

(57) ABSTRACT

In some implementations, a unified data repository (UDR) device may receive, from a policy control function (PCF) device, an addition request to add access and mobility (AM) policy data to an AM policy data resource of the UDR device. The AM policy data may be associated with a user equipment (UE). The UDR device may add, based on the addition request, the AM policy data to the AM policy data resource of the UDR device.

20 Claims, 11 Drawing Sheets

200

Subscription request to subscribe to receive data change notifications
140

Subscription request response
142

Second Network Device
104

UDR Device
108

100

New Subscription request to subscribe to receive data change notifications 148

New Subscription request response 150

Keep-alive communication 144

Keep-alive communication response 146

UDR Device 108

Second Network Device 104

100

600

610 Receive, by a UDR device and from a PCF device, an addition request to add AM policy data to an AM policy data resource of a UDR device 620 Add, by the UDR device and based on the addition request, the AM policy data to the AM policy data resource of the UDR device

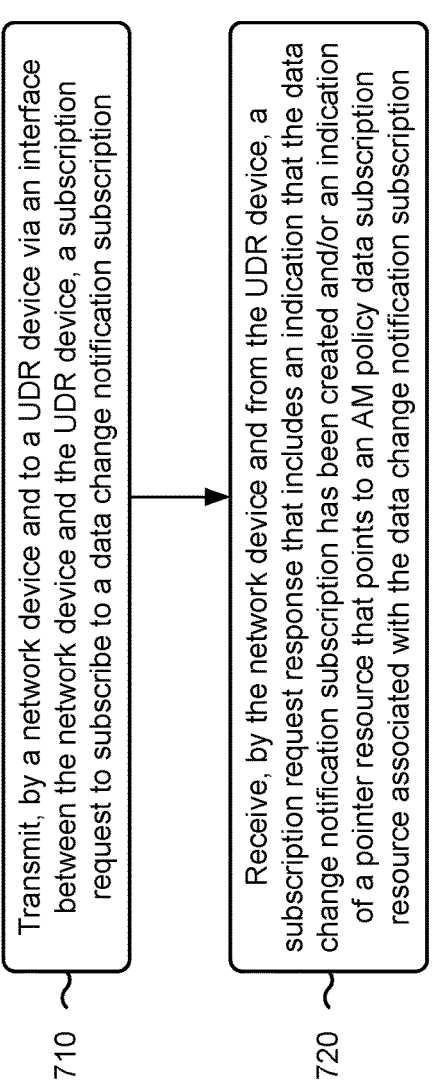

700

710 Transmit, by a network device and to a UDR device via an interface between the network device and the UDR device, a subscription request to subscribe to a data change notification subscription 720 Receive, by the network device and from the UDR device, a subscription request response that includes an indication that the data change notification subscription has been created and/or an indication of a pointer resource that points to an AM policy data subscription resource associated with the data change notification subscription

FIG. 7

SYSTEMS AND METHODS FOR OPTIMIZED NETWORK DEVICE COMMUNICATIONS

BACKGROUND

A unified data repository (UDR) device may support one or more network devices or network functions (e.g., a policy control function (PCF), a unified data management (UDM) device, and/or a network exposure function (NEF)). As an example, the one or more network devices or network functions may communicate (e.g., via an interface) with the UDR device to store and/or retrieve subscription data, policy data, structured data for exposure, and/or application data, among other examples. As another example, the one or more network devices or network functions may subscribe to receive data change notifications from the UDR device (e.g., based on the UDR device determining that data associated with a subscription is updated).

BRIEF DESCRIPTION OF THE DRAWINGS

FIG. 7 is a flowchart of an example process associated with optimized network device communications.

DETAILED DESCRIPTION OF EXAMPLE EMBODIMENTS

Figure 1A:
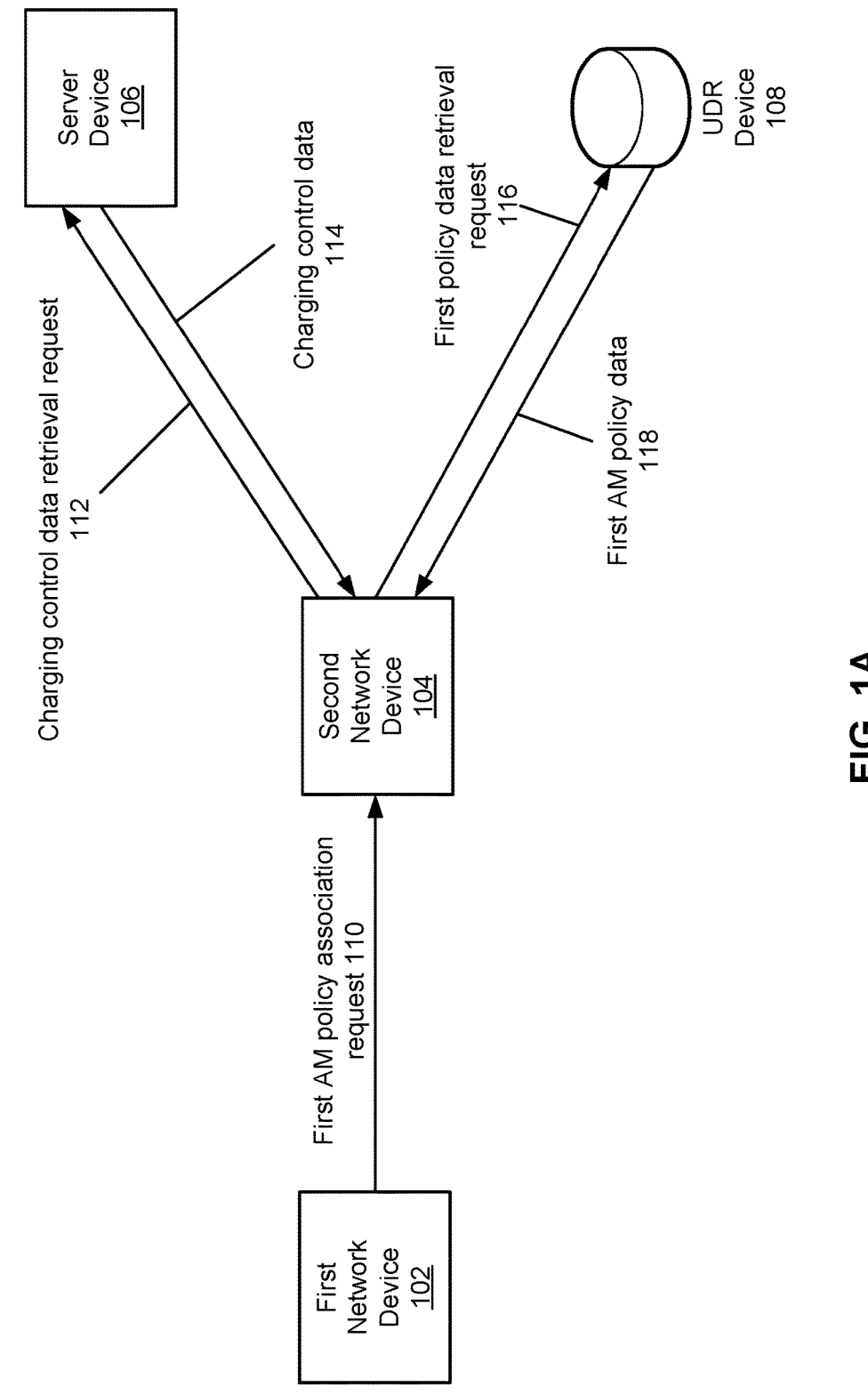
FIGS. 1A-1E are diagrams of an example associated with optimized network device communications.

The following detailed description of example implementations refers to the accompanying drawings. The same reference numbers in different drawings may identify the same or similar elements.

A subscriber, such as a subscriber of a mobile network operator (MNO), may be associated with a subscriber profile. The subscriber profile may include subscriber data (e.g., associated with a user equipment (UE) of the subscriber). A unified data repository (UDR) device may store subscriber data associated with one or more UEs (e.g., an individual UE and/or a group of UEs). For example, the subscriber data may include access and mobility (AM) policy data (e.g., associated with a UE of a subscriber), which may be included in an AM policy data resource of the UDR device. As another example, the subscriber data may include charging control data (e.g., data that is associated with charging a subscriber for use of network resources and/or data that is associated with limiting use of network resources, among other examples), which may be included in a charging control data resource associated with a charging function (CHF) device and/or in a data structure of a server device (e.g., a server device that is associated with the MNO).

As an example, a network device (e.g., a policy control function (PCF) device) may determine a policy (e.g., an AM policy associated with a UE) in response to a request (e.g., an AM policy association request) transmitted by another network device (e.g., an access and mobility management function (AMF) device). For example, to determine an AM policy (e.g., associated with a UE), a PCF device may obtain AM policy data included in an AM policy data resource of the UDR device and/or charging control data (e.g., associated with the UE) included in a charging control data resource of a network device (e.g., a CHF device) and/or a data structure of a server device (e.g., a server device that is associated with an MNO). The PCF device may determine the AM policy (e.g., associated with the UE) based on the AM policy data and/or the charging control data.

However, in some cases, the PCF device waits to receive data from both network devices (e.g., the AM policy data from the UDR device and the charging control data from the CHF device and/or the server device) before determining the AM policy, which can introduce latency (e.g., because of delays associated with receiving the data) and negatively affect network performance. In other words, the PCF device may use data and/or information from multiple network devices to determine policy data for a given UE. For example, if the PCF device is determining the AM policy in association with a session setup procedure and/or a registration procedure, then the increased latency (e.g., associated with the delays because of waiting to receive the data from both network devices) may result in an increased likelihood of a session setup timeout or a registration timeout, which can result in a fallback to a less desirable technology (e.g., a technology associated with reduced transfer speeds, reduced data rates, reduced throughput, and/or reduced quality of service (QOS) for the UE).

Furthermore, in some cases, the PCF device cannot and/or does not obtain data associated with determining the AM policy (e.g., because the UDR device, the CHF device, and/or the server device, among other examples, are unavailable). For example, the UDR device, the CHF device, and/or the server device may be unavailable because of a network failure, a power outage, a hardware failure, a software issue, a maintenance procedure, an overloading issue, and/or a cybersecurity issue, among other examples, which prevents the PCF device from obtaining the data. As another example, a subscription that provides the PCF device with data change notifications (e.g., associated with changes to the AM policy data and/or the charging control data) may become a stale subscription (e.g., a subscription that exists on the PCF device, but does not exist on the UDR device), which prevents the PCF device from obtaining updates to the data.

As a result, the PCF device may determine the AM policy based on stale information (e.g., information that is not current) and/or incomplete information, which may negatively affect network performance and/or may consume resources associated with determining the AM policy based on the stale information and/or associated with communicating the AM policy (e.g., that is based on the stale information) with other network devices or network functions. For example, if the PCF device determines an AM policy that causes a UE to be incorrectly provisioned with an upgraded QoS level (e.g., low latency) rather than being correctly provisioned with a standard QoS level (e.g., standard latency), then resources may be consumed that could have otherwise been conserved and/or used elsewhere (e.g., because more resources are used to provide the upgraded QoS level than the standard QoS level). As another example, the PCF device, an AMF device, and/or the UE may consume resources (e.g., network resources, processing resources, and/or power resources) associated with communicating, provisioning, and/or processing incorrect and/or outdated (e.g., stale) policy data.

Some implementations described herein enable optimized network device communications. For example, a network device (e.g., a PCF device) may communicate with another network device (e.g., a UDR device) to perform optimized interactions associated with policy data (e.g., AM policy data). As an example, the PCF device may obtain first AM policy data and/or charging control data (e.g., associated with a UE). The PCF device may determine an AM policy (e.g., associated with the UE) based on the first AM policy data and/or the charging control data. The PCF device may generate second AM policy data based on the AM policy. For example, the second AM policy data may include data that overrides at least a portion of the first AM policy data and/or that includes charging control data (e.g., that was not included in the first AM policy data). The PCF device may transmit, and the UDR device may receive, an addition request that indicates a request to add the second AM policy data to an AM policy data resource of the UDR device.

In some implementations, the PCF device may transmit, and the UDR device may receive, a data retrieval request that indicates a request to retrieve policy data from the UDR device. The UDR device may transmit, and the PCF device may receive, at least the second AM policy data. In this way, the PCF device may access the AM policy data included in the AM policy data resource of the UDR device quickly and efficiently, which enables the PCF device to determine an AM policy more efficiently (e.g., because the PCF device has access to the first AM policy data and the second AM policy data, the PCF device does not have to wait to receive data from two network devices before determining the AM policy).

Additionally, or alternatively, a risk of the PCF device not obtaining data (e.g., charging control data) because an external data source (e.g., the CHF device and/or the server device) is unavailable is mitigated. For example, if the CHF device is unavailable and the second AM policy data includes charging control data, then the PCF device may retrieve the charging control data from the UDR device rather than waiting for the CHF device to become available or making a policy decision without receiving the charging control data.

In some implementations, the PCF device may transmit, and the UDR device may receive, a subscription request to subscribe to a data change notification subscription (e.g., associated with an AM policy data resource of the UDR device). The UDR device may generate, based on the subscription request, an AM policy data subscription resource associated with the data change notification subscription. The UDR device may generate a pointer resource (e.g., an identifier) that points to the AM policy data subscription resource.

The UDR device may transmit, and the PCF device may receive, an indication of the AM policy data subscription resource and/or the pointer resource. The PCF device may transmit, and the UDR device may receive, at a periodic interval, a keep-alive communication associated with the data change notification subscription. The keep-alive communication may identify the pointer resource. The keep-alive communication may be associated with enabling the PCF device to validate that the subscription still exists in a resource of the UDR device (e.g., to determine whether the subscription is valid or still "alive").

In some implementations, the UDR device may determine whether the pointer resource exists (e.g., in memory of the UDR device), which enables the UDR device to determine whether the data change notification subscription exists (e.g., in memory of the UDR device). For example, the UDR device may determine that the data change notification subscription exists (e.g., that the data change notification subscription is valid) based on determining that the pointer resource is included in a data structure or a data resource associated with the UDR device and/or is indicated as being valid in the data structure or the data resource. As another example, the UDR device may determine that the data change notification subscription does not exist (e.g., that the data change notification subscription is not valid) based on determining that the pointer resource is not included in a data structure or a data resource associated with the UDR device and/or is indicated as being not valid in the data structure or the data resource. The UDR device may transmit, and the PCF device may receive, a keep-alive response based on the keep-alive communication. As an example, the keep-alive response may indicate whether the data change notification subscription exists and/or is valid (e.g., based on determining that the pointer resource is included in the data structure or the data resource associated with the UDR device and/or is indicated as being valid in the data structure or the data resource).

In some implementations, the PCF device may transmit, and the UDR device may receive, a new subscription request to subscribe to a new data change notification subscription based on the keep-alive response indicating that the data change notification subscription does not exist (e.g., that the data change notification subscription is not valid). The new data change notification subscription may be associated with the AM policy data resource of the UDR device. The PCF device may receive, and the UDR device may transmit, a new subscription request response that includes an indication that the new data change notification subscription has been created and/or an indication of a new pointer resource (e.g., a new identifier) that points to a new AM policy data subscription resource associated with the new data change notification subscription. In this way, the PCF device may verify whether a data change notification subscription is valid in a more reliable manner, which mitigates a risk of not receiving AM policy data updates because of a stale subscription. This also conserves resources (e.g., network resources, processing resources, and/or power resources) that would have otherwise been used attempting to obtain the data of the data change notification subscription and/or communicating with other network devices using old or stale data (e.g., because a new subscription is not generated).

FIGS. 1A-1E are diagrams of an example 100 associated with optimized network device communications. As shown in FIGS. 1A-1E, example 100 includes a first network device 102, a second network device 104, a server device 106, and a UDR device 108.

As shown in FIG. 1A, and by reference number 110, the first network device 102 (e.g., an AMF device) may transmit, and the second network device 104 (e.g., a PCF device) may receive, a first AM policy association request. As an example, the first AM policy association request may identify an individual UE (e.g., based on a subscription permanent identifier (SUPI) associated with the individual UE) and/or may indicate a request to determine an AM policy (e.g., associated with the UE), among other examples. In some implementations, the second network device 104 may determine the AM policy (e.g., associated with the UE) based on charging control data and/or AM policy data associated with the UE, as described in more detail elsewhere herein.

As shown by reference number 112, the second network device 104 may transmit, and the server device 106 may receive, a charging control data retrieval request. In some implementations, the server device 106 may be associated with an MNO. The MNO may configure the server device 106 to store (e.g., in a data structure associated with the server device 106) charging control data associated with the UE and/or a subscriber (e.g., a subscriber that is associated with the UE). The second network device 104 may transmit the charging control data retrieval request in response to receiving the first AM policy association request. The second network device 104 may use the charging control data to make policy decisions associated with the UE and/or the subscriber, as described in more detail elsewhere herein.

As shown by reference number 114, the second network device 104 may receive, and the server device 106 may transmit, charging control data. For example, the server device 106 may transmit the charging control data in response to receiving or obtaining the charging control data retrieval request. For example, the charging control data may include information associated with charging control data limits (e.g., spending limits associated with the UE and/or the subscriber).

In some implementations, the second network device 104 may determine the AM policy based on the charging control data limits. For example, if the UE and/or the subscriber is associated with a spending limit (e.g., a maximum monetary value), then the second network device 104 may determine the AM policy based on the spending limit. As an example, the AM policy (e.g., determined by the second network device 104) may include information that indicates that the UE may be provisioned with services and/or resources up to a value that equates to the spending limit. The second network device 104 may transmit, and the first network device 102 may receive the AM policy. The first network device 102 may enforce the AM policy. As an example, if the first network device 102 determines that the spending limit has been reached, then the first network device 102 may restrict the UE from accessing one or more services, limit the UE from accessing one or more services, throttle a data rate associated with the UE, limit the UE from accessing one or more data types, and/or restrict the UE from accessing one or more data types, among other examples.

Although the second network device 104 is described in connection with reference number 112 of FIG. 1A as communicating with the server device 106 to receive the charging control data, in some other implementations the second network device 104 may communicate with a network device (e.g., a CHF device) to receive the charging control data (e.g., via a subscription associated with charging control context data and/or spending limit data, among other examples). For example, the charging control data may include spending limit data that indicates a spending limit status associated with the UE and/or the subscriber (e.g., determined by the CHF device). As an example, the spending limit status may be a value that indicates whether the subscriber is using network resources within the spending limit set by the CHF device. For example, the second network device 104 may determine the AM policy associated with the UE based on the spending limit status (e.g., to enable the first network device 102 to enforce spending limits based on the spending limit status).

As shown by reference number 116, the second network device 104 may transmit, and the UDR device 108 may receive, a first policy data retrieval request. In some implementations, the MNO may provision the UDR device 108 with subscriber data (e.g., information associated with the subscriber profile). The second network device 104 may transmit the first policy data retrieval request in response to receiving the first AM policy association request. In some implementations, the first policy data retrieval request may be associated with indicating a request for AM policy data (e.g., associated with the UE and/or the subscriber). As an example, the second network device 104 may use the AM policy data to make policy decisions associated with the UE and/or the subscriber, as described in more detail elsewhere herein.

As shown by reference number 118, the UDR device 108 may transmit, and the second network device 104 may receive, first AM policy data. For example, the first AM policy data may include information associated with network access rights, service level agreement (SLA) information, location information, and/or billing information (e.g., associated with the UE and/or the subscriber), among other examples. For example, the first AM policy data may include information associated with a type of network access technology being used by the UE (e.g., Long-Term Evolution (LTE) and/or 5G, among other examples), a network identity (e.g., a Mobile Country Code (MCC) and/or a Mobile Network Code (MNC)), an access point and/or a base station that is in operable communication with the UE, and/or radio link parameters associated with the UE (e.g., a signal strength, a radio frequency (RF), and/or a data rate associated with the UE), among other examples. As another example, the first AM policy data may include mobility data associated with the UE. For example, the mobility data may include information associated with a current location, a direction of movement, a velocity, and historical handover information associated with the UE, among other examples. Thus, for example, the first AM policy data may enable the second network device 104 to make policy decisions associated with determining the AM policy associated with the UE, as described in more detail elsewhere herein.

Figure 1B:
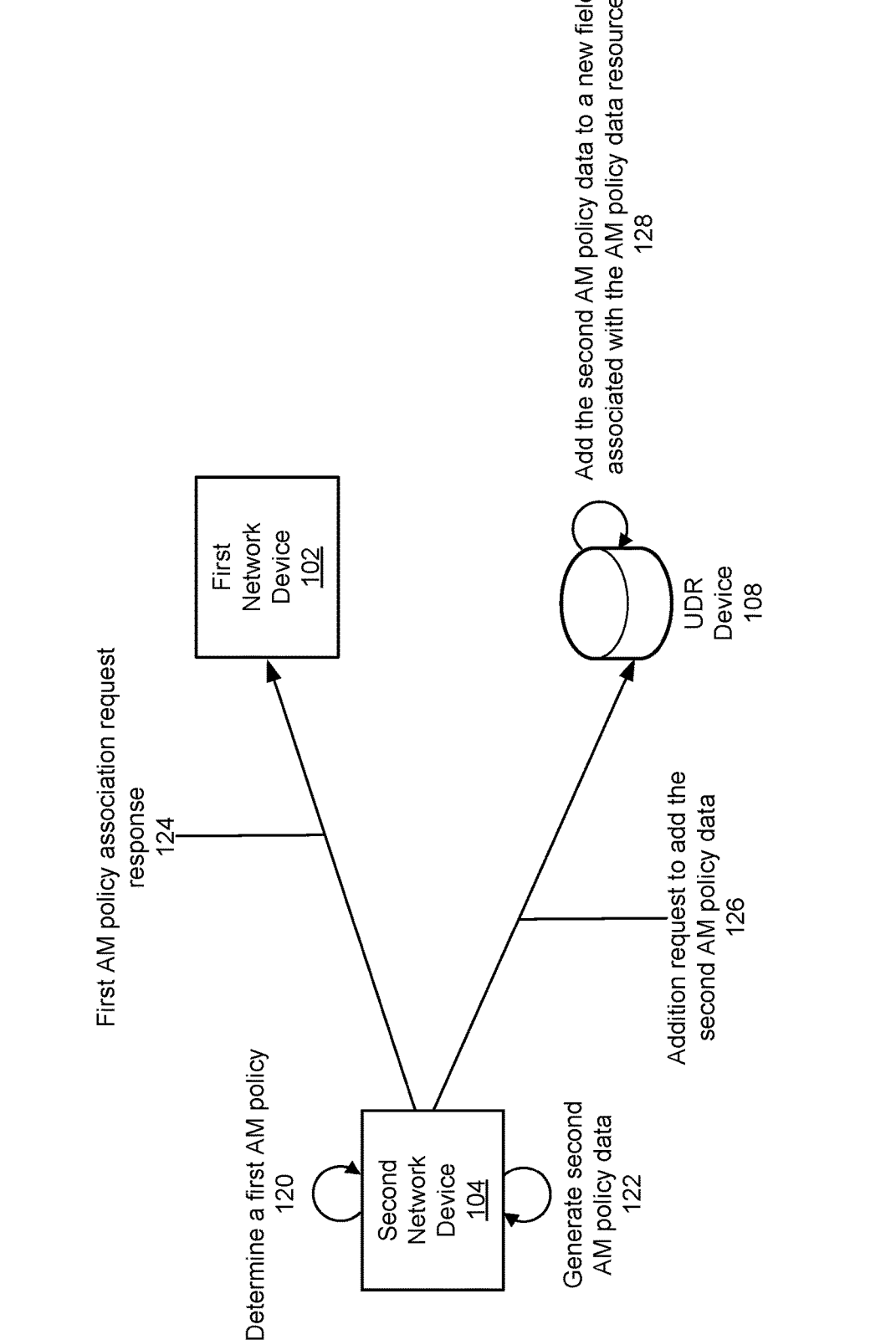

As shown in FIG. 1B, and by reference number 120, the second network device 104 may determine a first AM policy. For example, the second network device 104 may determine the first AM policy (e.g., associated with the UE) in response to receiving the first AM policy association request. In some implementations, the second network device 104 may determine the first AM policy associated with the UE based on the charging control data and/or the first AM policy data.

As an example, the first AM policy (e.g., determined by the second network device 104) may include one or more policy types associated with the UE. For example, the one or more policy types may include a network access policy (e.g., that indicates which access technology may be used by the UE), a service access policy (e.g., that indicates which services may be used by the UE), a charging policy (e.g., that indicates charging rates associated with services that are used by the UE), and/or a location-based policy (e.g., that indicates a region in which UE may access services), among other examples.

In some implementations, to determine the first AM policy, the second network device 104 may override, modify, and/or change the first AM policy data. For example, if the first AM policy data indicates that the UE has access to a standard set of services (e.g., associated with a first charging rate) and the charging control data indicates that the UE is associated with a second charging rate (e.g., associated with the UE having access to an upgraded set of services as compared to the standard set of services), then the first AM policy (e.g., determined by the second network device 104) may include information that indicates that the UE has access to the upgraded set of services based on the second charging rate. In other words, information included in the first AM policy may include information that overrides or modifies at least a portion of the first AM policy data (e.g., at least the portion that indicates the that the UE has access to the standard set of services).

In some implementations, the second network device 104 may override or modify the charging control data and/or the first AM policy data based on determining a change associated with network conditions and/or a change associated with AM policy data (e.g., associated with updates to the AM policy data included in the AM policy data resource of the UDR device 108). For example, if the second network device 104 determines that the wireless network (e.g., being accessed by the UE) is congested, then the second network device 104 may override the first AM policy data and/or the charging data to restrict access rights associated with the UE (e.g., to reduce a network load) and/or to enforce a new charging policy associated with the restricted access rights.

As another example, if the second network device 104 determines that a subscription associated with the UE is in a suspended status (e.g., based on receiving, form the server device 106 and/or another network device, a communication that indicates that the UE is in the suspended status), then the second network device 104 may override the charging control data and/or the first AM policy data to restrict access to services (e.g., based on the suspended status). In some implementations, the second network device 104 may generate second AM policy data (e.g., based on the information associated with the overrides indicated in the first AM policy, as described in more detail elsewhere herein).

As shown by reference number 122, the second network device 104 may generate second AM policy data. In some implementations, the second AM policy data may include information derived by the second network device 104, information obtained or received by the second network device 104 from an external data source (e.g., the server device 106 and/or another network device, among other examples), and/or information that overrides at least a portion of the first AM policy data, among other examples. For example, the second AM policy data may include charging control data (e.g., received from the server device 106 and/or another network device, among other examples) and/or data that is generated by the second network device 104 based on determining the first AM policy. For example, the second AM policy data may include information in the first AM policy that is not explicitly indicated via the first AM policy data.

As an example, the second AM policy data may include an indication of a spending limit status and/or modified subscriber data associated with a subscriber profile (e.g., of a subscriber of an MNO) and/or a given UE (e.g., a SUPI). The second network device 104 may include, in the first AM policy, at least a portion of the first AM policy data and the second AM policy data. In other words, the first AM policy may include information based on the first AM policy data, information that overrides information included in the first AM policy data (e.g., by information included in the second AM policy data), and/or new information that was not included in the first AM policy data, among other examples.

As shown by reference number 124, the second network device 104 may transmit, and the first network device 102 may receive, a first AM policy association request response. For example, the second network device 104 may transmit the first AM policy association request response in response to receiving the first AM policy association request (e.g., received as described in connection with reference number 110). As an example, the first AM policy association request response may include an indication of the first AM policy (e.g., determined by the second network device 104). The first AM policy may include at least a portion of the first AM policy data and the second AM policy data. The first network device 102 may enforce the first AM policy. For example, the first network device 102 may enforce the first AM policy by setting rules associated with managing data traffic (e.g., voice data traffic and/or video data traffic, among other examples) and/or charges associated with the UE and/or the subscriber (e.g., the first network device 102 may apply different policies associated with different types of data traffic). As another example, the first network device 102 may use mobility data associated with the UE to manage handovers associated with the UE.

As shown by reference number 126, the second network device 104 may transmit, and the UDR device 108 may receive, an addition request to add the second AM policy data (e.g., to the AM policy data resource of the UDR device 108). For example, the addition request may indicate a request to add the second AM policy data to the AM policy data resource maintained by the UDR device 108. As an example, the addition request may include an addition instruction associated with causing a new field to be generated, by the UDR device 108, in the AM policy data resource and/or the second AM policy data to be added to the new field, as described in more detail elsewhere herein.

As shown by reference number 128, the UDR device 108 may add the second AM policy data to the AM policy data resource (e.g., of the UDR device 108), such as in a new field of the AM policy data resource. For example, the UDR device 108 may generate the new field associated with the AM policy data resource based on the second AM policy data. As an example, if the second AM policy data indicates that the UE has access to upgraded services associated with an upgraded charging rate (e.g., based on the access to the upgraded services), then the UDR device 108 may generate an upgrade field of the AM policy data resource that is associated with indicating upgrade parameters associated with the upgraded services and/or the upgraded charging rate. The UDR device 108 may add the second AM policy data to the upgrade field associated with the AM policy data resource of the UDR device. As another example, the new field may be associated with indicating a spending limit associated with the subscriber, a charging limit associated with the subscriber, modified subscriber data, and/or QoS levels, among other examples.

Figure 1C:
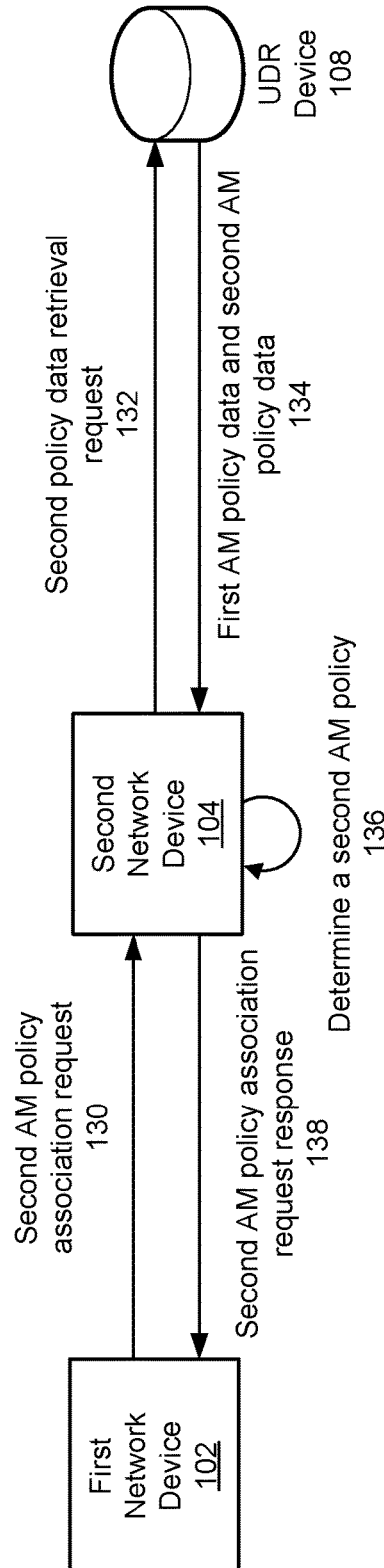

As shown in FIG. 1C, and by reference number 130, the first network device 102 may transmit, and the second network device 104 may receive, a second AM policy association request. As an example, the second AM policy association request may identify the individual UE (e.g., based on the SUPI) and/or may indicate a request to determine a second AM policy (e.g., associated with the UE), as described in connection with reference number 110 of FIG. 1A and/or as described in more detail elsewhere herein. For example, the first AM policy association request may be associated with a first session setup procedure and/or a first registration procedure and the second AM policy association request may be associated with a second session setup procedure and/or a second registration procedure.

As shown by reference number 132, the second network device 104 may transmit, and the UDR device 108 may receive, a second policy data retrieval request. In some implementations, the second policy data retrieval request may be associated with indicating a request for AM policy data (e.g., associated with the UE and/or the subscriber), as described in connection with reference number 116 of FIG. 1A and/or as described in more detail elsewhere herein.

As shown by reference number 134, the UDR device 108 may transmit, and the second network device 104 may receive, the first AM policy data (e.g., at least a portion of the first AM policy data) and the second AM policy data. For example, the UDR device 108 may obtain the first AM policy data and the second AM policy data (e.g., that includes information derived by the second network device 104, information obtained or received by the second network device 104 from an external data source, and/or information that overrides at least a portion of the first AM policy data, as described in more detail elsewhere herein) from the AM policy data resource of the UDR device 108 (e.g., in response to receiving the second policy data retrieval request).

The UDR device 108 may transmit the first AM policy data and the second AM policy data to the second network device 104 (e.g., after the UDR device 108 retrieves the first AM policy data and the second AM policy data from the AM policy data resource of the UDR device 108). Although the UDR device 108 has been described as transmitting the first AM policy data and the second AM policy data to the second network device 104, in some other implementations, the UDR device 108 may transmit, and the second network device 104 may receive, only the second AM policy data. As an example, if the first AM policy association request is associated with a first registration procedure and the second AM policy association request is associated with a second registration procedure, then the second network device 104 may indicate (e.g., via the second policy data retrieval request) that only the second AM policy data is to be retrieved by the UDR device 108.

Additionally, or alternatively, a risk of the second network device 104 not obtaining AM policy data (e.g., charging control data) because an external data source (e.g., the server device 106) is unavailable is mitigated. For example, if the server device 106 is unavailable and the second AM policy data includes charging control data (e.g., that is included in a data structure of the server device 106), then the second network device 104 device may retrieve the charging control data from the UDR device 108 rather than waiting for the server device 106 to become available or making a policy decision without receiving the charging control data.

As shown by reference number 136, the second network device 104 may determine a second AM policy. For example, the second network device 104 may determine the second AM policy (e.g., associated with the UE) in response to receiving the second AM policy association request. In some implementations, the second network device 104 may determine the second AM policy associated with the UE based on at least a portion of the first AM policy data and the second AM policy data. In this way, the second network device 104 does not need to wait to receive data from the server device 106 before determining the second AM policy. As a result, the second network device 104 conserves resources (e.g., network resources, processing resources, and/or power resources) that would have otherwise been used attempting to obtain the charging control data from the server device 106 (e.g., as described in connection with reference numbers 112 and 114 of FIG. 1A and/or as described in more detail elsewhere herein) before determining the second AM policy.

As shown by reference number 138, the second network device 104 may transmit, and the first network device 102 may receive, a second AM policy association request response. For example, the second network device 104 may transmit the second AM policy association request response in response to receiving the second AM policy association request. As an example, the second AM policy association request response may include an indication of the second AM policy (e.g., determined by the second network device 104). The second AM policy may include the first AM policy data and the second AM policy data. The first network device 102 may enforce the second AM policy in a similar manner as described elsewhere herein.

Figure 1D:
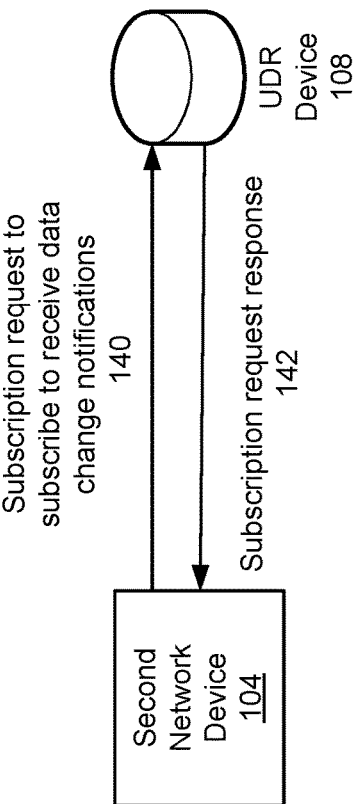
Figure 1E:
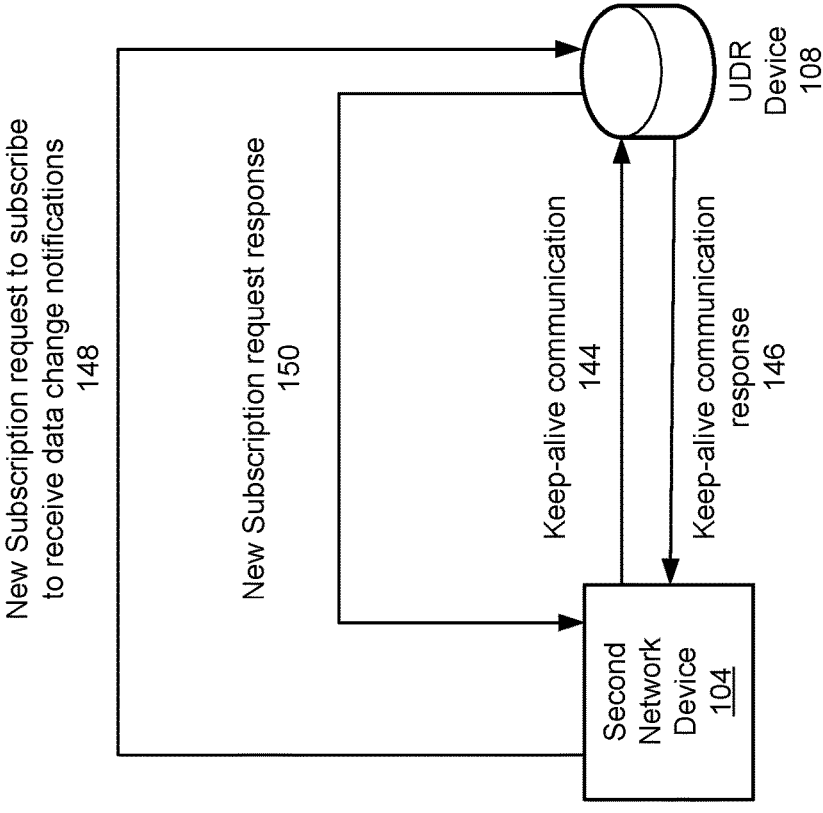

As shown in FIG. 1D, and by reference number 140, the second network device 104 may transmit, and the UDR device 108 may receive, a subscription request to subscribe to receive data change notifications. For example, the second network device 104 may transmit, to the UDR device 108 and via an interface between the network device and the UDR device (e.g., an Nudr interface and/or a N36 interface), a subscription request to subscribe to a data change notification subscription (e.g., associated with AM policy of a UE or a set of UEs).

The Nudr interface may be an interface defined (e.g., by a wireless communication standard, such as the 3rd Generation Partnership Project (3GPP)), for one or more network devices (e.g., a unified data management (UDM) device, a PCF device, and/or a network exposure function (NEF) device). The N36 interface may be defined (e.g., by 3GPP) as a reference point between the PCF device and the UDR device (e.g., for communications and/or interactions between the PCF device and the UDR device). In some implementations, the data change notification subscription may be associated with the AM policy data resource of the UDR device.

As shown by reference number 142, the second network device 104 may receive, and the UDR device 108 may transmit, a subscription request response. In some implementations, the subscription request response may include an indication that the data change notification subscription has been created and/or an indication of a pointer resource that points to an AM policy data subscription resource associated with the data change notification subscription. For example, the pointer resource may be a data structure that includes a subscription identifier. The subscription identifier may be associated with the AM policy data subscription resource and/or the data change notification subscription. As an example, the UDR device 108 may generate the subscription identifier based on creating the AM policy data subscription resource and/or the data change notification subscription.

In some implementations, the UDR device 108 may maintain the pointer resource (e.g., store the pointer resource as a data resource of the UDR device 108) during a time period that the AM policy data subscription resource is maintained (e.g., the AM policy data subscription resource is stored as a data resource of the UDR device 108) and/or during a time period that the data change notification subscription is valid. As an example, the UDR device 108 may not maintain the pointer resource during a time period that the UDR device 108 does not maintain the AM policy data subscription resource. As another example, the UDR device 108 may not maintain the pointer resource during a time period that the data change notification subscription is invalid. In this way, the second network device 104 may determine whether the data change notification subscription is valid based on determining whether the pointer resource exists (e.g., in the UDR device), as described in more detail elsewhere herein. Although the pointer resource has been described as a data structure that includes the subscription identifier in connection with reference number 142 of FIG. 1D, the pointer resource may be any suitable data structure and/or data resource.

As shown by reference number 144, the UDR device 108 may transmit, and the second network device 104 may receive, a keep-alive communication. For example, the second network device 104 may transmit the keep-alive communication via a Hypertext Transfer Protocol (HTTP) GET communication that is transmitted to the UDR device 108. In some implementations, the keep-alive communication may be associated with verifying whether the data change notification subscription is valid (e.g., whether a current subscription is being serviced by the UDR device 108). For example, the second network device 104 may transmit, and the UDR device 108 may receive, at a periodic interval (e.g., every x seconds or hours), the keep-alive communication (e.g., associated with the data change notification subscription).

In this way, the second network device 104 may verify whether a data change notification subscription is valid in a more reliable manner, which mitigates a risk of not receiving AM policy data updates because of a stale subscription. This also conserves resources (e.g., network resources, processing resources, and/or power resources) that would have otherwise been used attempting to obtain the data of the data change notification subscription and/or communicating with other network devices using old or stale data (e.g., because a new subscription is not generated).

In some implementations, the UDR device 108 may determine whether the pointer resource exists (e.g., in memory of the UDR device 108), which enables the UDR device 108 to determine whether the data change notification subscription exists (e.g., in memory of the UDR device 108). In other words, the UDR device 108 may validate that the data change notification subscription still exists in a resource of the UDR service 108 (e.g., to determine whether the subscription is valid or still "alive"). For example, the UDR device 108 may determine that the data change notification subscription exists (e.g., in memory of the UDR device 108) based on determining that the pointer resource exists (e.g., in memory of the UDR device 108). As another example, the UDR device 108 may determine that the data change notification subscription does not exist (e.g., in memory of the UDR device 108) based on determining that the pointer resource does not exist (e.g., in memory of the UDR device 108). The UDR device 108 may transmit, and the second network device 104 may receive, a keep-alive response based on the keep-alive communication, as described in more detail elsewhere herein.

As shown by reference number 146, the second network device 104 may receive, and the UDR device 108 may transmit, a keep-alive response (e.g., based on the keep-alive communication). In some implementations, the keep-alive response may indicate whether the data change notification subscription exists (e.g., based on determining whether the pointer resource exists). As an example, keep-alive response may indicate that the data change notification subscription exists (e.g., based on the UDR device 108 determining that the pointer resource exists) or may indicate that the data change notification subscription does not exist (e.g., based on the UDR device 108 determining that the pointer resource does not exist).

As shown by reference number 148, the second network device 104 may transmit, and the UDR device 108 may receive, a new subscription request to subscribe to a new data change notification subscription based on the keep-alive response indicating that the data change notification subscription does not exist. As an example, the new data change notification subscription may be associated with the AM policy data resource of the UDR device.

As shown by reference number 150, the second network device 104 may receive, and the UDR device 108 may transmit, a new subscription request response. In some implementations, the new subscription request response may include an indication that the new data change notification subscription has been created and/or an indication of a new pointer resource that points to a new AM policy data subscription resource associated with the new data change notification subscription.

In this way, the second network device 104 (e.g., the PCF device) may access the AM policy data included in the AM policy data resource of the UDR device quickly and efficiently, which enables the second network device 104 to more efficiently determine an AM policy (e.g., because the second network device 104 has access to at least a portion of the first AM policy data and the second AM policy data, the second network device 104 does not have to wait to receive data from two network devices before determining the AM policy). Additionally, or alternatively, the second network device 104 may verify whether a data change notification subscription is valid in a more reliable manner, which mitigates a risk of not receiving AM policy data updates because of a stale subscription.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
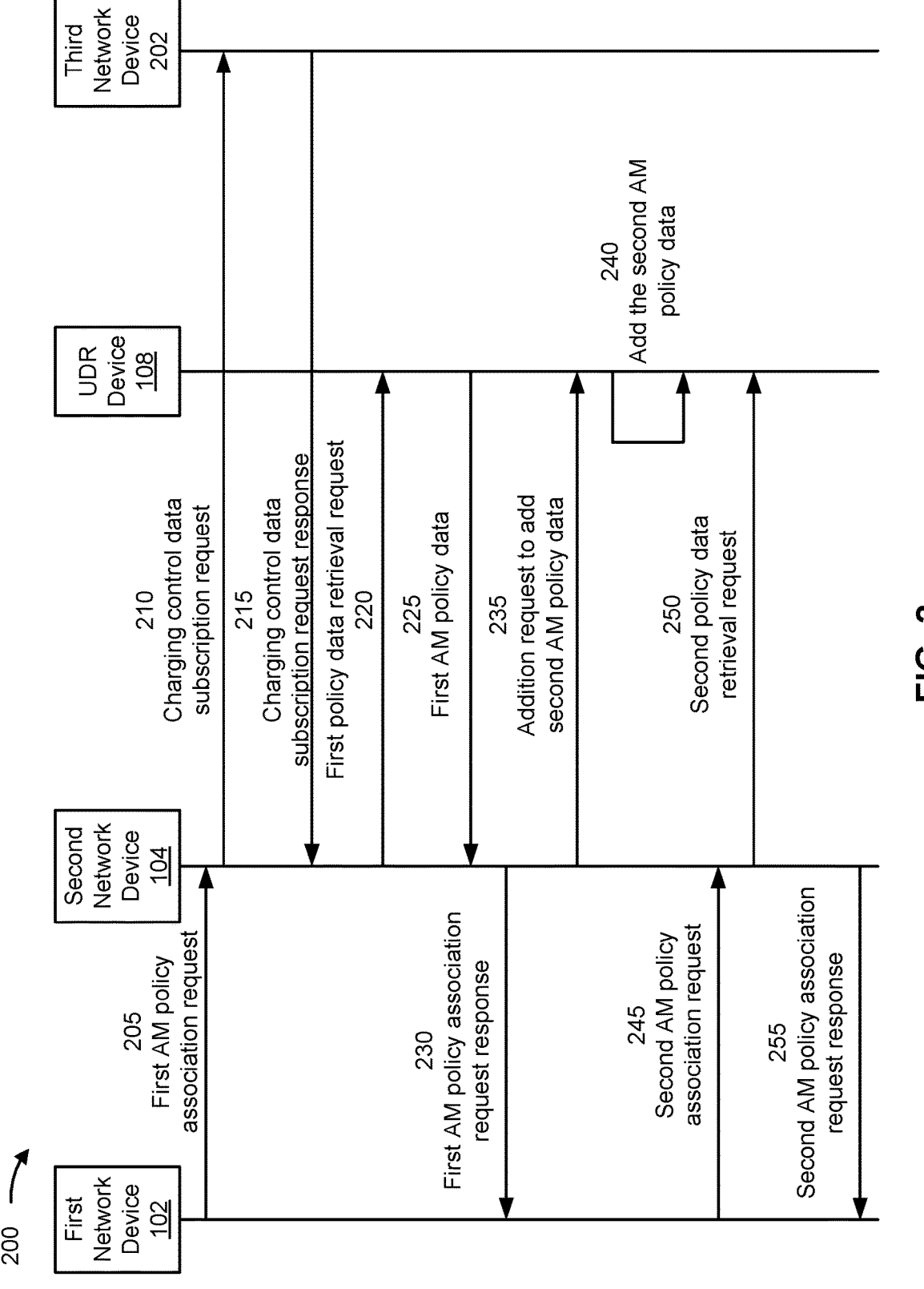
FIG. 2 is a diagram of an example associated with optimized network device communications.

FIG. 2 is a diagram of an example 200 associated with optimized network device communications. As shown in FIG. 2, example 200 includes a second network device 104, a third network device 202, and a UDR device 108. Example 200 of FIG. 2 is associated with adding and/or updating AM policy data associated with an AM policy data resource of the UDR device 108 and/or obtaining the AM policy data that is added and/or updated in a similar manner as described above and/or in more detail elsewhere herein.

As shown in FIG. 2, and by reference number 205, the first network device 102 (e.g., an AMF device) may transmit, and the second network device 104 (e.g., a PCF device) may receive, a first AM policy association request in a similar manner as described above in connection with reference number 110 of FIG. 1A and/or as described in more detail elsewhere herein. In some implementations, the first AM policy association request may be associated with a registration procedure (e.g., that is based on a registration request transmitted to the first network device 102 by a UE).

As shown by reference number 210, the second network device 104 may transmit, and the third network device 202 (e.g., a CHF device) may receive, a charging control data subscription request. For example, the second network device 104 may transmit (e.g., via an HTTP POST communication or another application layer protocol) the charging control data subscription request to the third network device 202. As an example, the charging control data subscription request may indicate a request to subscribe to receive spending limit data associated with one or more policy counters that are associated with the UE and/or a subscriber)

and/or a request to receive notifications associated with the spending limit data (e.g., notifications associated with updated spending limit data).

As shown by reference number 215, the second network device 104 may receive, and the third network device 202 may transmit, a charging control data subscription request response. For example, the third network device 202 may obtain the spending limit data included in a data structure of the third network device 202. The charging control data subscription request response may include an indication of the spending limit data and/or an indication of a subscription to receive the notifications associated with the spending limit data.

As shown by reference number 220, the second network device 104 may transmit, and the UDR device 108 may receive, a first policy data retrieval request, as described above in connection with reference number 116 of FIG. 1A and/or as described in more detail elsewhere herein. For example, the second network device 104 may transmit (e.g., via an HTTP GET communication or another application layer protocol) the first policy data retrieval request to the UDR device 108. As an example, the first policy data retrieval request may indicate a request to retrieve first AM policy data associated with the subscriber and/or the UE.

As shown by reference number 225, the UDR device 108 may transmit, and the second network device 104 may receive, the first AM policy data, as described above in connection with reference number 118 of FIG. 1A and/or as described in more detail elsewhere herein. For example, the UDR device 108 may obtain the first AM policy data from an AM policy data resource of the UDR device 108 and may transmit the first AM policy data to the second network device 104.

As shown by reference number 230, the second network device 104 may transmit, and the first network device 102 may receive, a first AM policy association request response, as described in connection with reference number 124 of FIG. 1B and/or as described in more detail elsewhere herein. For example, the second network device 104 may determine a first AM policy based on the spending limit data and/or the first AM policy data.

As shown by reference number 235, the second network device 104 may transmit, and the UDR device 108 may receive, an addition request to add second AM policy data (e.g., to the AM policy data resource of the UDR device 108). For example, the second network device 104 may determine to add the spending limit data to the AM policy resource of the UDR device 108. As an example, the second network device 104 may include the spending limit data in the second AM policy data.

As shown by reference number 240, the UDR device 108 may add the second AM policy data to a new field associated with the AM policy data. For example, the UDR device 108 may generate the new field associated with the AM policy data resource based on the second AM policy data. As an example, the UDR device 108 may generate a spending limit data field that is associated with the AM policy data resource of the UDR device 108. The UDR device 108 may add the second AM policy data to the spending limit data field associated with the AM policy data resource of the UDR device.

As another example, the new field may be associated with indicating a spending limit associated with the subscriber, a charging limit associated with the subscriber, modified subscriber data, and/or QoS levels, among other examples. In this way, a risk of the second network device 104 device not obtaining the spending limit data (e.g., via a notification provided by the UDR device 108 to the second network device 104) because the third network device 202 is unavailable (e.g., because of a power outage) is mitigated. For example, if the third network device 202 is unavailable, then the second network device 104 may retrieve the spending limit data from the UDR device 108 (e.g., because the spending limit data is added to the AM policy data resource of the UDR device 108).

As shown by reference number 245, the first network device 102 may transmit, and the second network device 104 may receive, a second AM policy association request. In some implementations, the second AM policy association request may be associated with another registration procedure (e.g., that is based on another registration request transmitted to the first network device 102 by the UE).

As shown by reference number 250, the second network device 104 may transmit, and the UDR device 108 may receive, a second policy data retrieval request. As an example, the second network device 104 may transmit (e.g., via an HTTP GET communication or another application layer protocol) the second policy data retrieval request to the UDR device 108. As an example, the second policy data retrieval request may indicate a request to retrieve the first AM policy data and/or the second AM policy data. In this way, the second network device 104 may access the AM policy data included in the AM policy data resource of the UDR device 108 quickly and efficiently, which enables the second network device 104 to more efficiently perform operations associated with the second AM policy association request (e.g., determine the second AM policy without operations associated with retrieving the spending limit data from the third network device 202).

As shown by reference number 255, the second network device 104 may transmit, and the first network device 102 may receive, a second AM policy association request response, as described in connection with reference number 138 of FIG. 1C and/or as described in more detail elsewhere herein.

In this way, the second network device 104 (e.g., the PCF device) may access the AM policy data included in the AM policy data resource of the UDR device 108 quickly and efficiently, which enables the second network device 104 to more efficiently determine an AM policy (e.g., because the second network device 104 has access to at least a portion of the first AM policy data and the second AM policy data, the second network device 104e does not have to wait to receive data from two network devices before determining the AM policy).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
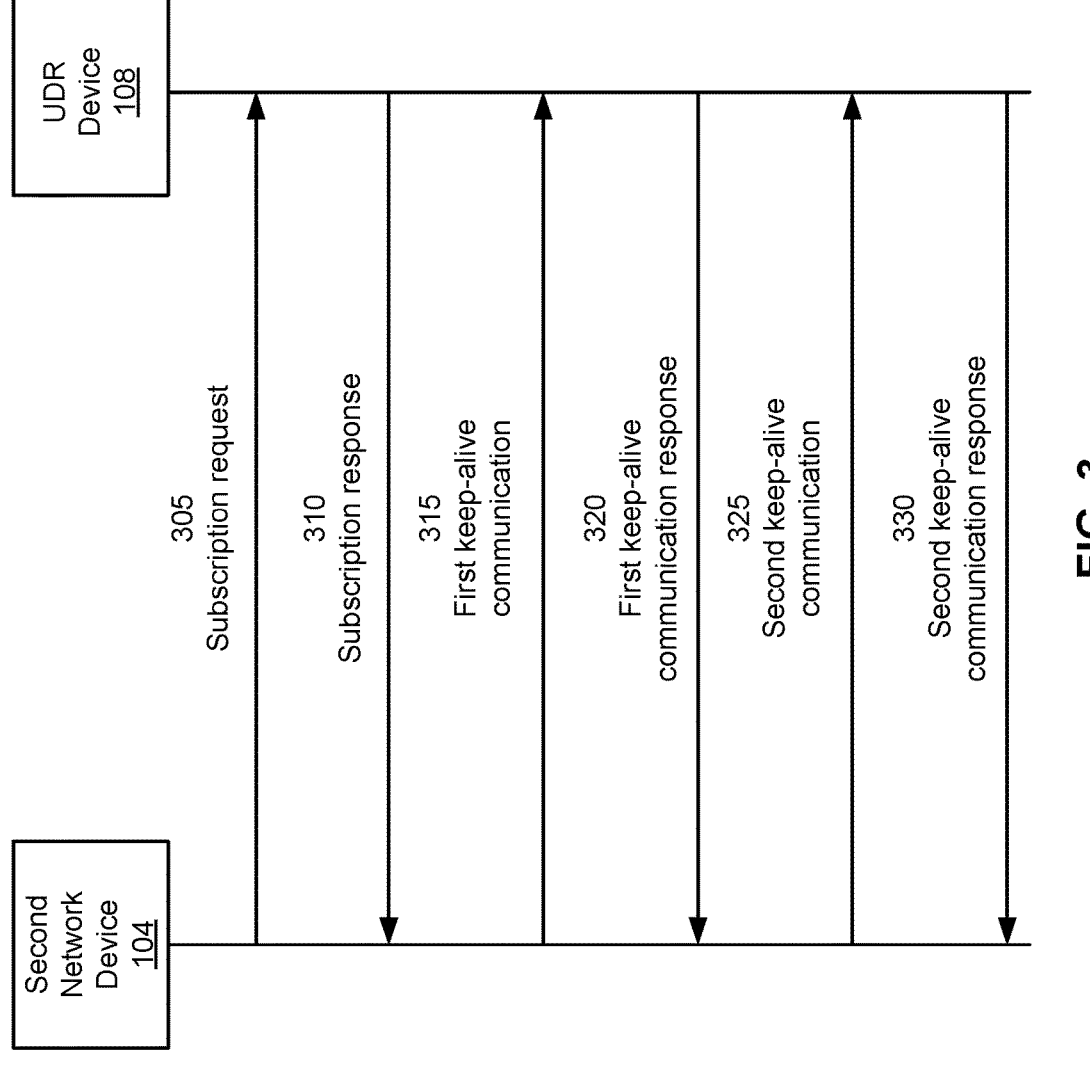
FIG. 3 is a diagram of an example associated with optimized network device communications.

FIG. 3 is a diagram of an example 300 associated with optimized network device communications. As shown in FIG. 3, example 300 includes a second network device 104 and a UDR device 108. Example 300 of FIG. 3 is associated with determining whether a data change notification subscription is valid (e.g., maintained by the UDR device 108) in a similar manner as described above and in more detail elsewhere herein.

As shown in FIG. 3, and by reference number 305, the second network device 104 may transmit, and the UDR device 108 may receive, a subscription request to subscribe to receive data change notifications associated with an AM policy data resource. For example, the second network device 104 may transmit the subscription request to the UDR device 108 after obtaining AM policy data from the UDR device 108.

As shown by reference number 310, the second network device 104 may receive, and the UDR device 108 may transmit, a subscription request response. For example, the UDR device 108 may generate a subscription based on the subscription request. In some implementations, the UDR device 108 may generate a first data resource (e.g., a subscription identifier) that is associated with a second data resource (e.g., an AM policy data subscription resource that is associated with the subscription). For example, if the second data resource is valid (e.g., if the second data resource is maintained and/or serviced by the UDR device 108), then the UDR device 108 may maintain the first data resource (e.g., the first data resource is a current data resource of the UDR device 108). As another example, if the second data resource is not valid, then the UDR device 108 may refrain from maintaining the first data resource.

A shown by reference number 315, the UDR device 108 may transmit, and the second network device 104 may receive, a first keep-alive communication. For example, the second network device 104 may transmit the first keep-alive communication via an HTTP GET communication that is transmitted to the UDR device 108. The first keep-alive communication may include an indication of the first data resource (e.g., the subscription identifier). In some implementations, the first keep-alive communication may be associated with verifying whether the subscription is valid (e.g., whether the subscription is being serviced by the UDR device 108). For example, the second network device 104 may transmit, and the UDR device 108 may receive, at a periodic interval (e.g., every x seconds or hours), the first keep-alive communication (e.g., associated with the subscription).

As shown by reference number 320, the second network device 104 may receive, and the UDR device 108 may transmit, a first keep-alive response (e.g., based on the first keep-alive communication). In some implementations, the first keep-alive communication response may indicate whether the subscription is valid. In some implementations, the UDR device 108 may determine whether the subscription is valid by determining whether the first data resource is being maintained by the UDR device 108. As an example, the UDR device 108 may determine that the subscription is valid based on determining that the first data resource is being maintained (e.g., the first data resource is a current data resource of the UDR device 108). As another example, the UDR device 108 may determine that the subscription is not valid based on determining that the first data resource is not being maintained (e.g., the first data resource is not a current data resource of the UDR device 108). The first keepalive communication response may include an indication of whether the subscription is valid.

A shown by reference number 325, the UDR device 108 may transmit, and the second network device 104 may receive, a second keep-alive communication in a similar manner as described in connection with reference number 315 of FIG. 3 and/or as described in more detail elsewhere herein. In some implementations, the second network device 104 may transmit the second keep-alive communication according to a schedule. For example, the second network device 104 may transmit the first keep-alive communication at a first time and may transmit the second keep-alive communication at a second time (e.g., that is later then the first time).

As shown by reference number 330, subscription status request response, the second network device 104 may receive, and the UDR device 108 may transmit, a second keep-alive response (e.g., based on the second keep-alive communication) in a similar manner as described in connection with reference number 320 of FIG. 3 and/or as described in more detail elsewhere herein.

In some implementations, the first keep-alive communication and/or the second keep-alive communication may be transmitted or provided by the second network device 104 based on a time period. For example, the time period may be associated with a validity period of the data change notification subscription. As an example, if the validity period of the data change notification subscription is three hours (e.g., from a time that the data change notification subscription is created), then the second network device 104 may transmit the first keep-alive communication one hour after the data change notification subscription and/or may transmit the second keep-alive communication two hours after the data change notification subscription is created (e.g., to ensure that the data change notification is valid during the validity period).

In this way, the second network device 104 may verify whether a data change notification subscription is valid in a more reliable manner, which mitigates a risk of not receiving AM policy data updates because of a stale subscription. This also conserves resources (e.g., network resources, processing resources, and/or power resources) that would have otherwise been used attempting to obtain the data of the data change notification subscription and/or communicating with other network devices using old or stale data (e.g., because a new subscription is not generated).

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
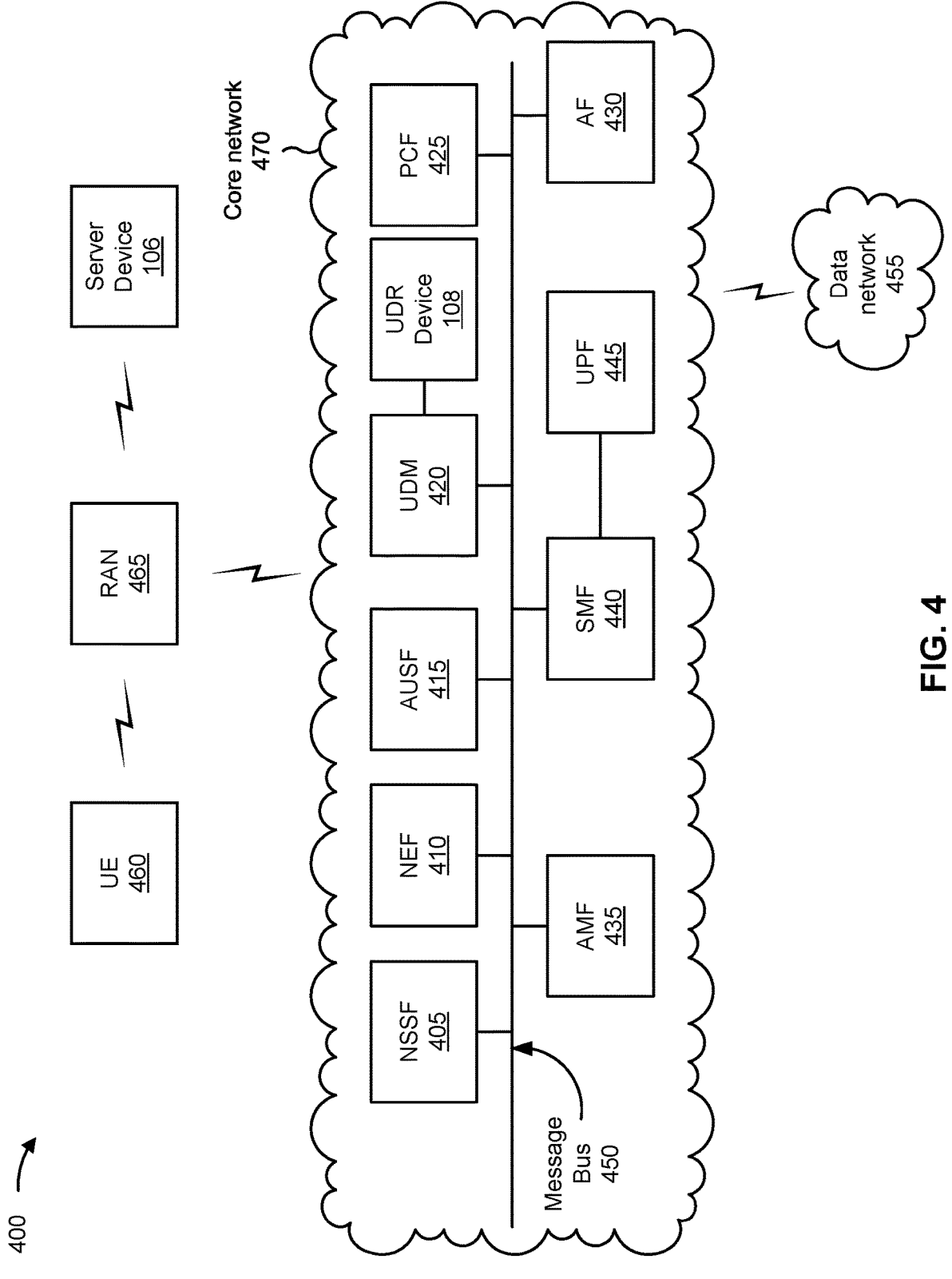
FIG. 4 is a diagram of an example environment in which systems and/or methods described herein may be implemented.

FIG. 4 is a diagram of an example environment 400 in which systems and/or methods described herein may be implemented. As shown in FIG. 4, example environment 400 may include a server device 106, a data network 455, a UE 460, a RAN 465, and a core network 470. Devices and/or networks of example environment 400 may interconnect via wired connections, wireless connections, or a combination of wired and wireless connections.

The server device 106 may include one or more devices capable of receiving, generating, storing, processing, providing, and/or routing information associated with optimized network device communications, as described elsewhere herein. In some implementations, the server device 106 may be associated with an MNO that is associated with the RAN 465 and/or the core network 470. The server device 106 may include a communication device and/or a computing device. For example, the server device 106 may include a server, such as an application server, a client server, a web server, a database server, a host server, a proxy server, a virtual server (e.g., executing on computing hardware), or a server in a cloud computing system. In some implementations, the server device 106 may include computing hardware used in a cloud computing environment. In some implementations, the server device 106 may be a device and/or a function included in the core network 470.

UE 460 includes one or more devices capable of receiving, generating, storing, processing, and/or providing information, such as information described herein. For example, UE 460 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 465 may support, for example, a cellular radio access technology (RAT). RAN 465 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 460. RAN 465 may transfer traffic between UE 460 (e.g., using a cellular RAT), one or more base stations (e.g., using a wireless interface or a backhaul interface, such as a wired backhaul interface), and/or core network 470. RAN 465 may provide one or more cells that cover geographic areas.

In some implementations, RAN 465 may perform scheduling and/or resource management for UE 460 covered by RAN 465 (e.g., UE 460 covered by a cell provided by RAN 465). In some implementations, RAN 465 may be controlled or coordinated by a network controller, which may perform load balancing, network-level configuration, and/or other operations. The network controller may communicate with RAN 465 via a wireless or wireline backhaul. In some implementations, RAN 465 may include a network controller, a self-organizing network (SON) module or component, or a similar module or component. In other words, RAN 465 may perform network control, scheduling, and/or network management functions (e.g., for uplink, downlink, and/or sidelink communications of UE 460 covered by RAN 465).

In some implementations, core network 470 may include an example functional architecture in which systems and/or methods described herein may be implemented. For example, core network 470 may include an example architecture of a fifth generation (5G) next generation (NG) core network included in a 5G wireless telecommunications system. While the example architecture of core network 470 shown in FIG. 2 may be an example of a service-based architecture, in some implementations, core network 470 may be implemented as a reference-point architecture and/or a 4G core network, among other examples.

As shown in FIG. 4, core network 470 may include a number of functional elements. The functional elements may include, for example, a network slice selection function (NSSF) 405, a network exposure function (NEF) 410, an authentication server function (AUSF) 415, a unified data management (UDM) component 420, a policy control function (PCF) 425, an application function (AF) 430, an access and mobility management function (AMF) 435, a session management function (SMF) 440, and/or a user plane function (UPF) 445. For example, the first network device 102, the second network device 104, and/or the third network device 202 may be the NSSF 405, the NEF 410, the AUSF 415, the UDM component 420, the PCF 425, the AF 430, the AMF 435, the SMF 440, and/or the UPF 445. As another example, the first network device 102 may be the AMF 435, the second network device 104 may be the PCF 425, and/or the third network device may be a CHF device (e.g., which may track and/or report resource usage associated with a UE in the telecommunications system).

These functional elements may be communicatively connected via a message bus 450. Each of the functional elements shown in FIG. 4 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 405 includes one or more devices that select network slice instances for UE 460. By providing network slicing, NSSF 405 allows an operator to deploy multiple substantially independent end-to-end networks potentially with the same infrastructure. In some implementations, each slice may be customized for different services.

NEF 410 includes one or more devices that support exposure of capabilities and/or events in the wireless telecommunications system to help other entities in the wireless telecommunications system discover network services.

AUSF 415 includes one or more devices that act as an authentication server and support the process of authenticating UE 460 in the wireless telecommunications system.

UDM 420 includes one or more devices that store user data and profiles in the wireless telecommunications system. UDM 420 may be used for fixed access and/or mobile access in core network 470.

PCF 425 includes one or more devices that provide a policy framework that incorporates network slicing, roaming, packet processing, and/or mobility management, among other examples.

AF 430 includes one or more devices that support application influence on traffic routing, access to NEF 410, and/or policy control, among other examples.

AMF 435 includes one or more devices that act as a termination point for non-access stratum (NAS) signaling and/or mobility management, among other examples.

SMF 440 includes one or more devices that support the establishment, modification, and release of communication sessions in the wireless telecommunications system. For example, SMF 440 may configure traffic steering policies at UPF 445 and/or may enforce user equipment IP address allocation and policies, among other examples.

UPF 445 includes one or more devices that serve as an anchor point for intra-RAT and/or inter-RAT mobility. UPF 445 may apply rules to packets, such as rules pertaining to packet routing, traffic reporting, and/or handling user plane QoS, among other examples.

Message bus 450 represents a communication structure for communication among the functional elements. In other words, message bus 450 may permit communication between two or more functional elements.

Data network 455 includes one or more wired and/or wireless data networks. For example, data network 455 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example environment 400 may perform one or more functions described as being performed by another set of devices of example environment 400.

Figure 5:
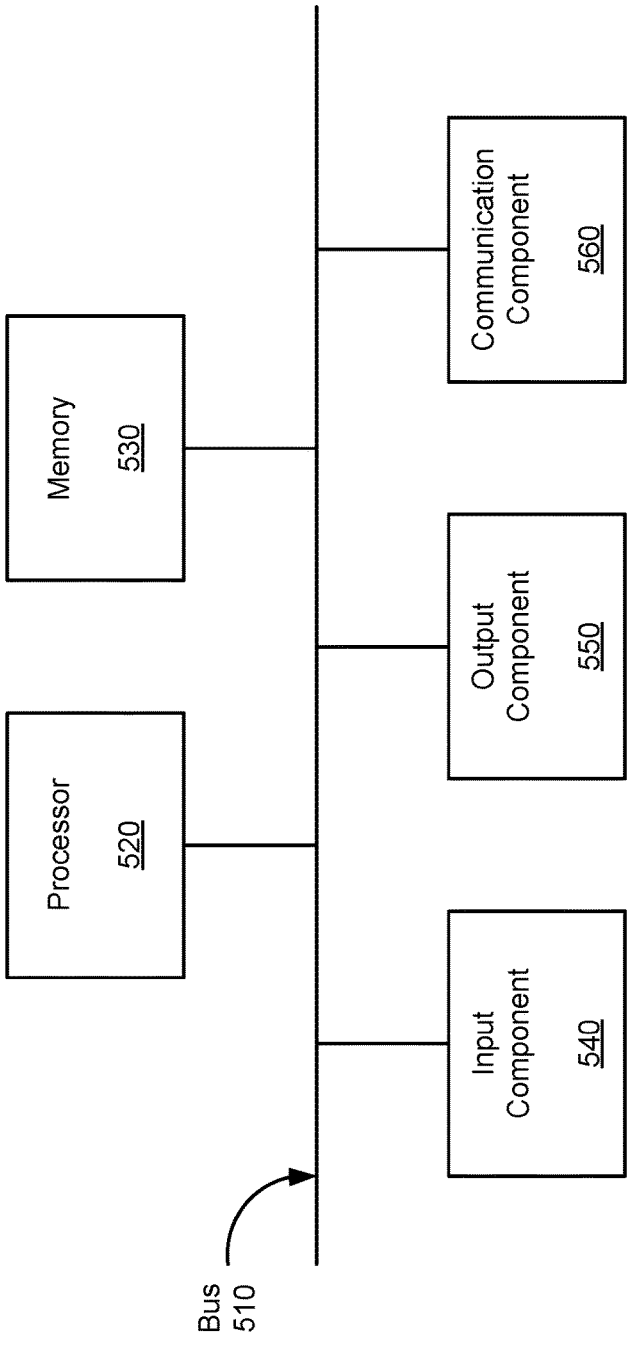
FIG. 5 is a diagram of example components of a device associated with optimized network device communications.

FIG. 5 is a diagram of example components of a device 500 associated with optimized network device communications. The device 500 may correspond to the first network device 102, the second network device 104, the server device 106, and/or the UDR device 108. In some implementations, the first network device 102, the second network device 104, the server device 106, and/or the UDR device 108 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor

520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
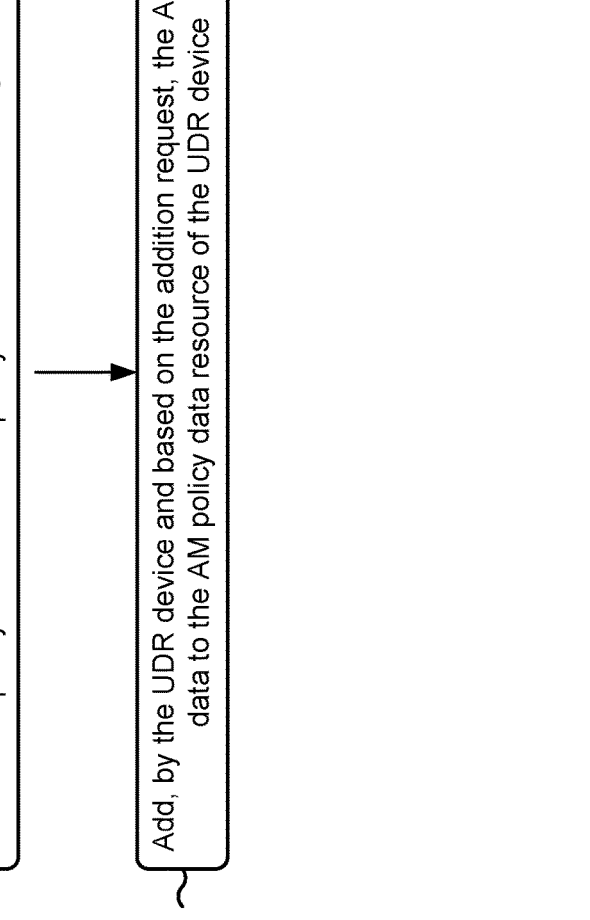
FIG. 6 is a flowchart of an example process associated with optimized network device communications.

FIG. 6 is a flowchart of an example process 600 associated with optimized network device communications. In some implementations, one or more process blocks of FIG. 6 may be performed by a UDR device (e.g., the UDR device 108). In some implementations, one or more process blocks of FIG. 6 may be performed by another device or a group of devices separate from or including the UDR device, such as a first network device (e.g., the first network device 102), a second network device (e.g., the second network device 104), and/or a server device (e.g., the server device 106). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from a PCF device, an addition request to add AM policy data to an AM policy data resource of the UDR device (block 610). For example, the UDR device may receive, from the PCF device, an addition request to add the AM policy data to the AM policy data resource of the UDR device, as described above. In some implementations, the AM policy data may be associated with a UE. As an example, the AM policy data may include charging control data and/or AM policy data associated with the UE. As another example, the AM policy data may be associated with an AM policy that is associated with the UE (e.g., that is determined by the PCF device).

As further shown in FIG. 6, process 600 may include adding, based on the addition request, the AM policy data to the AM policy data resource of the UDR device (block 620). For example, the UDR device may add, based on the addition request, the AM policy data to the AM policy data resource of the UDR device, as described above. As an example, the UDR device may generate a new field associated with the AM policy data resource. The UDR device may add the AM policy data to the new field associated with the AM policy data resource.

In some implementations, process 600 includes receiving, by the UDR device and from the PCF device, a data retrieval request to retrieve policy data associated with the UE, and transmitting, by the UDR device and to the PCF device, at least the AM policy data that is added to the AM policy data resource based on the addition request.

In some implementations, process 600 may include receiving, by the UDR device and from the PCF device, a subscription request to subscribe to receive data change notifications from the UDR device. As an example, the data change notifications may be associated with the AM policy data resource. The UDR device may generate, based on the subscription request, an AM policy data subscription resource associated with a subscription to receive the data change notifications. The UDR device may generate a pointer resource, which may be a pointer that points to the AM policy data subscription resource. The UDR device may transmit, and the PCF device may receive, an indication of the AM policy data subscription resource and an indication of the pointer resource.

In some implementations, process 600 includes receiving, by the UDR device and from the PCF device, at a periodic interval, a keep-alive communication associated with a subscription to receive data change notifications from the UDR device. As an example, the keep-alive communication may identify the pointer resource of the UDR device (e.g., a pointer that points to the AM policy data subscription resource of the UDR device that is associated with the data change notification subscription. The UDR device may determine whether the pointer resource exists in the UDR device. The UDR device may transmit, and the PCF device may receive, a keep-alive response based on determining whether the pointer resource exists in the UDR device.

In some implementations, the UDR device may receive, and the PCF device may transmit, a new subscription request to subscribe to a new data change notification subscription based on the keep-alive response indicating that the data change notification subscription does not exist. As an example, the new data change notification subscription may be associated with the AM policy data resource of the UDR device. The UDR device may transmit, and the PCF device may receive, a new subscription request response that includes an indication that the new data change notification subscription has been created and/or an indication of a new pointer resource that points to a new AM policy data subscription resource associated with the new data change notification subscription.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 associated with optimized network device communications. In some implementations, one or more process blocks of FIG. 7 may be performed by a network device (e.g., the second network device 104). In some implementations, one or more process blocks of FIG. 7 may be performed by another device or a group of devices separate from or including the network device, such as a first network device (e.g., the first network device 102), a server device (e.g., the server device 106), and/or a UDR device (e.g., the UDR device 108). Additionally, or alternatively, one or more process blocks of FIG. 7 may be performed by one or more components of device 500, such as processor 520, memory 530, input component 540, output component 550, and/or communication component 560.

As shown in FIG. 7, process 700 may include transmitting, to a UDR device via an interface between the network device and the UDR device, a subscription request to subscribe to a data change notification subscription (block 710). For example, the network device may transmit, to a UDR device via the interface between the network device and the UDR device, a subscription request to subscribe to a data change notification subscription, as described above. In some implementations, the data change notification subscription may be associated with an AM policy data resource of the UDR device.

As further shown in FIG. 7, process 700 may include receiving, from the UDR device, a subscription request response that includes an indication that the data change notification subscription has been created and/or an indication of a pointer resource that points to an AM policy data subscription resource associated with the data change notification subscription: (block 720). For example, the network device may receive, from the UDR device, a subscription request response that includes: an indication that the data change notification subscription has been created and/or an indication of a pointer resource that points to an AM policy data subscription resource associated with the data change notification subscription, as described above.

In some implementations, process 700 includes transmitting, to the UDR device and at a periodic interval, a keep-alive communication associated with the data change notification subscription. As an example, the keep-alive communication may identify the pointer resource. The network device may receive, from the UDR device and based on the keep-alive communication, a keep-alive response.

In some implementations, process 700 includes transmitting, to the UDR device, a new subscription request to subscribe to a new data change notification subscription based on the keep-alive response indicating that the data change notification subscription does not exist. The new data change notification subscription may be associated with the AM policy data resource of the UDR device. The network device may receive, from the UDR device, a new subscription request response that includes an indication that the new data change notification subscription has been created and/or an indication of a new pointer resource that points to a new AM policy data subscription resource associated with the new data change notification subscription.

In some implementations, process 700 includes generating AM policy data, and transmitting, via the interface between the network device and the UDR device, an addition request that indicates a request to add the AM policy data to the AM policy data resource. As an example, the addition request may include an addition instruction associated with causing a new field to be generated in the AM policy data resource and the AM policy data to be added to the new field. As another example, the network device may generate AM policy data based on determining an AM policy.

In some implementations, process 700 includes transmitting, to the UDR device, a data retrieval request that indicates a request to retrieve AM policy data included in the AM policy data resource, wherein at least a portion of the AM policy data included in the AM policy data resource is generated by the network device. As an example the AM policy data resource may include AM policy data that is generated by the network device. As another example, the AM policy data may include charging control data (e.g., associated with a UE).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a unified data repository (UDR) device and from a policy control function (PCF) device, an addition request to add access and mobility (AM) policy data to an AM policy data resource of the UDR device, wherein the AM policy data is associated with a user equipment (UE);

adding, by the UDR device and based on the addition request, the AM policy data to the AM policy data resource of the UDR device;

generating, by the UDR device and based on a subscription request from the PCF device to subscribe to receive data change notifications from the UDR device, an AM policy data subscription resource associated with a subscription to receive the data change notifications;

generating, by the UDR device, a pointer resource that points to the AM policy data subscription resource; and transmitting, by the UDR device and to the PCF device, an indication that includes an indication of the AM policy data subscription resource and an indication of the pointer resource.

2. The method of claim 1, wherein adding the AM policy data to the AM policy data resource of the UDR device comprises:

generating, by the UDR device, a new field associated with the AM policy data resource; and adding, by the UDR device, the AM policy data to the new field.

3. The method of claim 1, wherein the AM policy data includes charging control data associated with the UE.

4. The method of claim 1, wherein the AM policy data is associated with an AM policy that is associated with the UE.

5. The method of claim 1, further comprising:

receiving, by the UDR device and from the PCF device, a data retrieval request to retrieve policy data associated with the UE; and transmitting, by the UDR device and to the PCF device, at least the AM policy data that is added to the AM policy data resource based on the addition request.

6. The method of claim 1, further comprising:
receiving, by the UDR device and from the PCF device, the subscription request.

7. The method of claim 1, further comprising:
receiving, by the UDR device and from the PCF device, at a periodic interval, a keep-alive communication associated with the subscription to receive the data change notifications,
    wherein the keep-alive communication identifies the pointer resource;
determining, by the UDR device, whether the pointer resource exists in the UDR device; and
transmitting, by the UDR device and to the PCF device, a keep-alive response based on determining whether the pointer resource exists in the UDR device.

8. A non-transitory computer-readable medium storing a set of instructions, the set of instructions comprising:
one or more instructions that, when executed by one or more processors of a unified data repository (UDR) device, cause the UDR device to:
    receive, from a policy control function (PCF) device, an addition request to add access and mobility (AM) policy data to an AM policy data resource of the UDR device,
        wherein the AM policy data is associated with a user equipment (UE);
    add, based on the addition request, the AM policy data to the AM policy data resource of the UDR device;
    generate, based on a subscription request from the PCF device to subscribe to receive data change notifications from the UDR device, an AM policy data subscription resource associated with a subscription to receive the data change notifications;
    generate a pointer resource that points to the AM policy data subscription resource; and
    transmit, to the PCF device, an indication that includes an indication of the AM policy data subscription resource and an indication of the pointer resource.

9. The non-transitory computer-readable medium of claim 8,
wherein the one or more instructions, that cause the UDR device to add the AM policy data to the AM policy data resource of the UDR device, cause the UDR device to:
    generate a new field associated with the AM policy data resource; and
    add the AM policy data to the new field.

10. The non-transitory computer-readable medium of claim 8,
wherein the AM policy data includes charging control data associated with the UE.

11. The non-transitory computer-readable medium of claim 8,
wherein the AM policy data is associated with an AM policy that is associated with the UE.

12. The non-transitory computer-readable medium of claim 8,
wherein the one or more instructions further cause the UDR device to:
    receive, from the PCF device, a data retrieval request to retrieve policy data associated with the UE; and
    transmit, to the PCF device, at least the AM policy data that is added to the AM policy data resource based on the addition request.

13. The non-transitory computer-readable medium of claim 8,
wherein the one or more instructions further cause the UDR device to:
    receive, from the PCF device, the subscription request.

14. A unified data repository (UDR) device, comprising:
one or more processors configured to:
    receive, from a policy control function (PCF) device, an addition request to add access and mobility (AM) policy data to an AM policy data resource of the UDR device,
        wherein the AM policy data is associated with a user equipment (UE);
    add, based on the addition request, the AM policy data to the AM policy data resource of the UDR device;
    generate, based on a subscription request from the PCF device to subscribe to receive data change notifications from the UDR device, an AM policy data subscription resource associated with a subscription to receive the data change notifications;
    generate a pointer resource that points to the AM policy data subscription resource; and
    transmit, to the PCF device, an indication that includes an indication of the AM policy data subscription resource and an indication of the pointer resource.

15. The UDR device of claim 14,
wherein the one or more processors, to add the AM policy data to the AM policy data resource of the UDR device, are configured to:
    generate a new field associated with the AM policy data resource; and
    add the AM policy data to the new field.

16. The UDR of claim 14,
wherein the AM policy data includes charging control data associated with the UE.

17. The UDR of claim 14,
wherein the AM policy data is associated with an AM policy that is associated with the UE.

18. The UDR device of claim 14,
wherein the one or more processors are further configured to:
    receive, from the PCF device, a data retrieval request to retrieve policy data associated with the UE; and
    transmit, to the PCF device, at least the AM policy data that is added to the AM policy data resource based on the addition request.

19. The UDR device of claim 14,
wherein the one or more processors are further configured to:
    receive, from the PCF device, the subscription request.

20. The UDR device of claim 14,
wherein the one or more processors are further configured to:
    receive, from the PCF device, at a periodic interval, a keep-alive communication associated with the subscription to receive the data change notifications
        wherein the keep-alive communication identifies the pointer resource;
    determine whether the pointer resource exists in the UDR device; and
    transmit, to the PCF device, a keep-alive response based on determining whether the pointer resource exists in the UDR device.

* * * * *